Feb. 3, 1970     E. E. McCULLOUGH     3,492,815
MEANS FOR FORMING RADIAL SLOTS IN SOLID PROPELLANT GRAINS
Filed March 10, 1967     2 Sheets-Sheet 1

INVENTOR.
EDWARD E. McCULLOUGH

BY *Edwin D. Grant*

ATTORNEY

Feb. 3, 1970  E. E. McCULLOUGH  3,492,815
MEANS FOR FORMING RADIAL SLOTS IN SOLID PROPELLANT GRAINS
Filed March 10, 1967  2 Sheets-Sheet 2

INVENTOR.
EDWARD E. McCULLOUGH
BY Edwin O. Grant

ATTORNEY

United States Patent Office 3,492,815
Patented Feb. 3, 1970

3,492,815
MEANS FOR FORMING RADIAL SLOTS IN SOLID PROPELLANT GRAINS
Edward E. McCullough, Brigham City, Utah, assignor to Thiokol Chemical Corporation, Bristol, Pa., a corporation of Delaware
Filed Mar. 10, 1967, Ser. No. 622,171
Int. Cl. F02c *3/26;* F02k *9/04;* F42b *5/16*
U.S. Cl. 60—39.47                                        8 Claims

ABSTRACT OF THE DISCLOSURE

Spacers formed of solid propellant are disposed between solid propellant grains of a rocket motor to provide radially extending passages therebetween, thus eliminating the problems associated with removal of slot formers of the prior art.

---

This invention relates generally to solid propellant rocket motors and more particularly to means for forming radially extending slots (i.e., slots that extend radially from a central, longitudinal perforation in a solid propellant grain to the casing in which the grain is disposed) in solid propellant rocket motors.

Among the advantages of forming radially extending slots in solid propellant rocket motors are the following: (1) such slots relieve or prevent stresses within a solid propellant grain, or between a grain and the casing to which it is bonded, which can develop during the curing of the solid propellant of the grain; (2) such slots increase the burning surface area of a solid propellant grain and also maintain this area relatively constant as the grain is consumed; and (3) where thrust reversal capacity is desired in a rocket motor, such slots provide passages for ducting thrust gas to ports located in the forward portion of a rocket casing.

Heretofore radially extending slots have been formed in solid propellant rocket motors by means of frangible molds which are positioned within rocket casings at the time propellant grains are being cast therein, and which are broken and removed in pieces from the propellant grains after the latter have been cured to the solid state. The molds used in such conventional slot-forming techniques are usually elaborate in construction and thus expensive to manufacture. Furthermore, removal of the molds from solid propellant can only be accomplished by use of special equipment and expenditure of considerable time and effort.

The present invention avoids these difficulties by providing means for forming slots in solid propellant grains which are easy to make and which do not require subsequent removal from the grains. As will be described in detail hereinafter, a preferred embodiment of the invention consists essentially of two spaced-apart disks of precured solid propellant disposed between two solid propellant grains. During the casting of the aforesaid solid propellant grains, the disks of precured solid propellant are held in position within a rocket casing by means of a mandrel which also serves to form a central combustion cavity in the grains. After the solid propellant grains have been cured, only the mandrel must be removed from the rocket casing.

It is accordingly an object of this invention to provide inexpensive convenient means for forming radially extending slots in solid propellant rocket motors.

Another object of the invention is to provide slot-forming means for solid propellant rocket motors, which means do not require removal from the rocket motors.

An additional object of the invention is to provide means for precise combustion control in a radially extending slot formed in a solid propellant rocket motor.

The manner in which the foregoing and other objects of the invention are achieved will become manifest in the following description of several embodiments of the invention, wherein reference is made to the accompanying drawings.

In the drawings.

Throughout the specification and the drawings, like numbers designate like parts.

Figure 1:
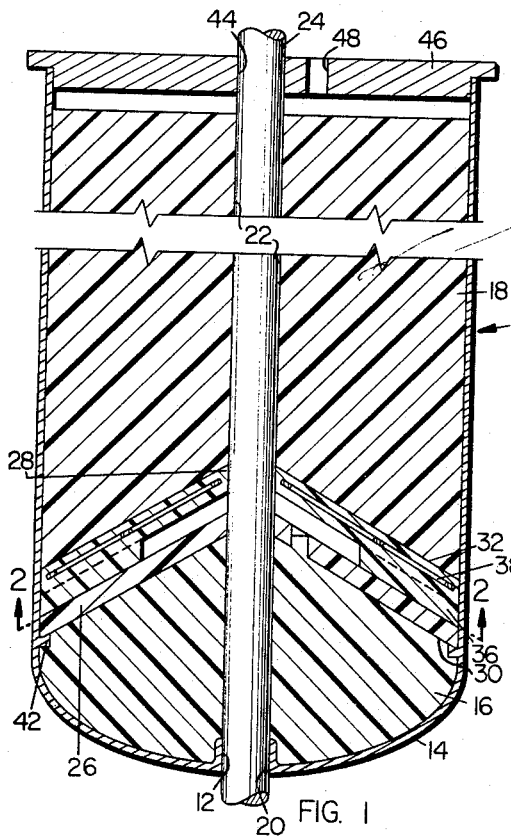
FIGURE 1 is a sectional view taken along the longitudinal axis of a solid propellant rocket motor assembly constituting a preferred embodiment of the invention.
Figure 2:
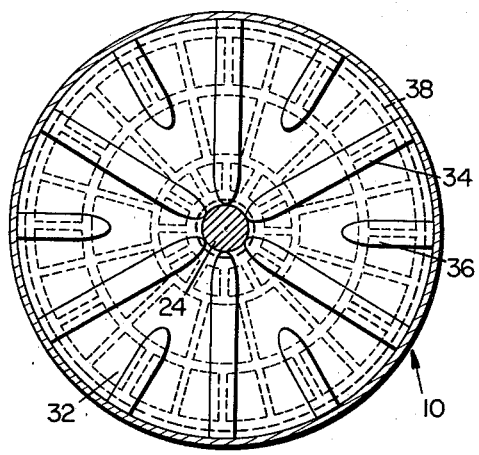
FIGURE 2 is a cross-sectional view of the same rocket motor assembly, taken along the conical surface represented by line 2—2 in FIGURE 1 in the indicated direction.

In FIGURE 1 the number 10 generally designates a rocket motor casing having an aperture 12 in the forward end closure 14 thereof. Disposed in spaced, tandem relation within casing 10 are first and second solid propellant grains 16, 18 each of which contains a longitudinally extending perforation 20, 22 when a mandrel 24 is removed from the grains after a preferred process embodiment of the invention (which will be described hereinafter) has been carried out. The adjacent end surfaces 26, 28 of grains 16, 18 are convergent toward the aft end of casing 10, and first and second centrally-apertured, conical support disks 30, 32 respectively abut these surfaces. Second support disk 32 is formed with a plurality of elongated spacers 34, 36 that project from the forward side thereof and abut the aft side of first support disk 30. More specifically, as illustrated in FIGURE 2, spacers 34, 36 are evenly spaced apart circumferentially of casing 10 and disposed radially thereof, and the shorter spacers 36 are alternately disposed with the longer spacers 34. The inner ends of the longer spacers 34 are coterminous with the edge of the aperture in the center of second support disk 32. In the preferred embodiment of the invention, both support disks 30, 32 (as well as spacers 34, 36 integrally formed on support disk 32) are formed of solid propellant having the following composition:

| | Weight percent |
|---|---|
| Polybutadiene acrylic acid | 10.62 |
| Epoxide curing agent ($C_{19}H_{23}O_4$) | 2.25 |
| Ammonium perchlorate | 69.31 |
| Aluminum powder | 15.84 |
| Ferric oxide | .99 |
| Dioctyl sebacate | .99 |

Support disks 30, 32 are molded by conventional techniques and cured by exposure to 135° F. for 96 hours. To impart rigidity to second support disk 32, a web of reinforcement 38 is embedded therein, this reinforcement being illustrated by broken lines in FIGURE 2 and being preferably formed of a strong, light metal such as an aluminum alloy. For a purpose that will appear hereinafter, an access hole 40 extends through first support disk 30.

A preferred method of manufacturing the rocket motor assembly illustrated in FIGURES 1 and 2 employs the aforementioned mandrel 24 to hold support disks 30, 32 in proper position within casing 10 during the casting of grains 16, 18 and to form the perforations 20, 22 in said grains. Assembly of the components is carried out with casing 10 supported in a vertical position. First support disk 30 is placed within casing 10 and supported upon a plurality of lugs 42 circumferentially spaced about the inner surface of said casing and equidistant from the forward end of said casing. Mandrel 24 is positioned within the central aperture in first support disk 30, aperture 12 in the forward end closure 14 of casing 10, and an aperture 44 in a positioning fixture 46 that is removably attached to the aft end of said casing. Interfaces between first support disk 30 and mandrel 24 and between said first support disk and casing 10 are coated with a silicone rubber or similar sealant to form a seal therebetween. Fluid, uncured propellant is then injected, under vacuum conditions within casing 10, through access hole 40 in first support disk 30 into the space within said casing below said first support disk, this process step being accomplished by means of a hose (not shown) that is extended through a hole 48 in positioning fixture 46 and through said access hole 40. After the level of the propellant reaches the top of access hole 40, the injection hose is withdrawn from casing 10 and the injected propellant is cured by conventional techniques to form the solid propellant grain 16. After positioning fixture 46 has been removed from the aft end of casing 10, second support disk 32 is positioned on mandrel 24 and then lowered within said casing to bring the spacers 34, 36 thereof into abutment with the aft, or upper, surface of first support disk 30. Interfaces between second support disk 32 and mandrel 24 and between said second support disk and casing 10 are coated with a silicone rubber or similar sealant to form a seal therebetween. Positioning fixture 46 is again positioned on mandrel 24 and secured to the aft end of casing 10, and fluid, uncured propellant is injected, under vacuum conditions within said casing, into the space within said casing between second support disk 32 and said positioning fixture 46. This propellant is subsequently cured to form the solid propellant grain 18, and mandrel 24 is then withdrawn from this grain and grain 16, thereby bringing the spaces between spacers 34, 36 into communication with the perforations 20, 22 in said grains and with the orifice of a thrust nozzle (not shown) that is mounted on the aft end of casing 10 to form a complete rocket motor.

A most important advantage of the above-described rocket motor assembly is that it eliminates the difficulties associated with the removal of conventional slot-forming devices from the solid propellant grain of a rocket motor. In addition, combustion in the radially extending spaces between spacers 34, 36 (which spaces will hereinafter be referred to as the "slot" of the rocket motor) can be precisely controlled by applying, in different thickness and location, one or more layers of a combustion-inhibiting composition to first and second support disks 30, 32 and spacers 34, 36 respectively. For example, it may be desirable that the initial burning surface in the slot be only the surfaces of spacers 34, 36 and the exposed surface of first support disk 30. In this case, the surface of second support disk 32 between spacers 34, 36 will be coated with the combustion-inhibiting composition. Many different combustion-inhibiting materials may be employed to control the burning of the slot-forming components (i.e., first and second support disks 30, 32 and spacers 34, 36). For example, the following composition is suitable:

| | Weight percent |
|---|---|
| Polybutadiene acrylic acrylonitrile terpolymer | 46.70 |
| Carbon particles | 49.00 |
| Tris[1-(2-methyl)aziridinyl]phosphine oxide | 1.40 |
| Iron octoate (6%) (Ferric salt of 2-ethyl hexanoic acid in 6% solution, or ferric-2-ethyl hexoate) | .90 |
| p-(2,3epoxypropoxy) N,-2-3 diepoxypropylaniline | 1.00 |
| Tri glyceride of hydroxy stearic acid | 1.00 |

Figure 3:
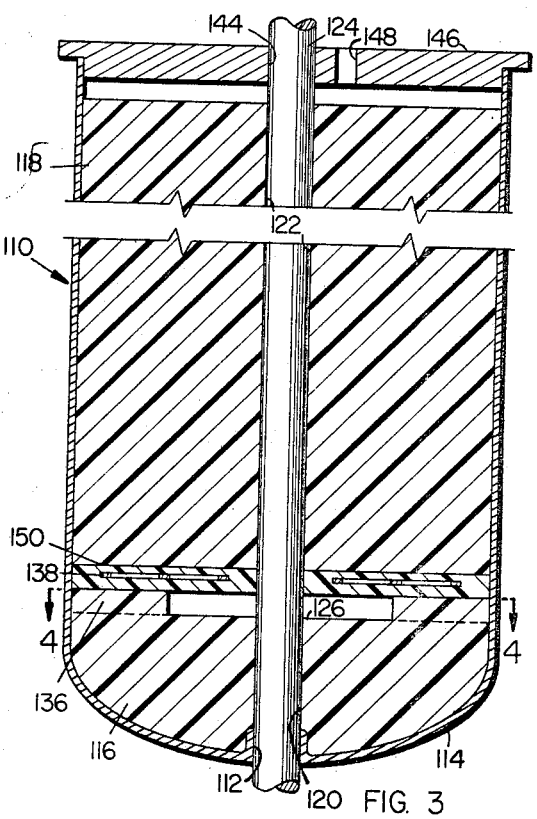
FIGURE 3 is a sectional view taken along the longitudinal axis of a second solid propellant rocket motor assembly constituting another embodiment of the invention.
Figure 4:
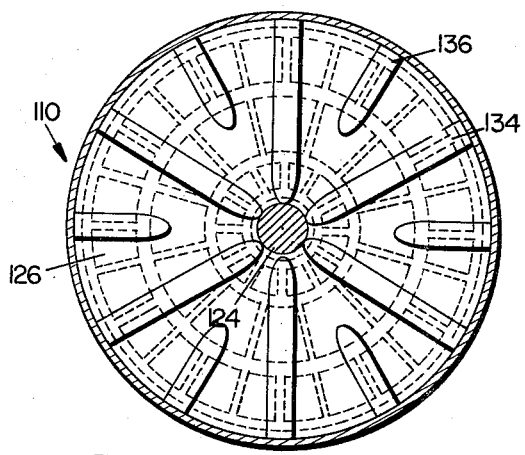
FIGURE 4 is a cross-sectional view of the rocket motor assembly of FIGURE 3, taken along the plane represented by line 4—4 in the latter drawing in the indicated direction.

FIGURES 3 and 4 illustrate a second embodiment of the invention comprising a plurality of spacers 134, 136 which are integrally formed on a first solid propellant grain 116 and which project from the aft end surface 126 thereof. As in the arrangement of spacers 34, 36 of the first-described embodiment of the invention, spacers 134, 136 are evenly spaced apart circumferentially of casing 110 and disposed radially thereof, the shorter spacers 136 are alternately disposed with the longer spacers 134, and the inner ends of the longer spacers 134 are coterminous with the edge of an aperture centrally located in a preformed, flat support disk 150 of solid propellant. A web of reinforcement 138 increases the rigidity of support disk 150.

It will be recognized that end surface 126 and spacers 134, 136 can be formed on first grain 116 by means of a centrally-apertured, disk-shaped mold plate (not shown) having a suitably contoured end surface and positioned within casing 110 at the point where a radially extending slot is to be located in the rocket motor. In accordance with the process steps which have been described hereinbefore, casing 110 is held in a vertical position and the space in said casing below the aforesaid mold plate is filled with fluid, uncured propellant to form a first solid propellant grain 116. After this propellant has been cured to the solid state, the mold plate is removed from casing 110, and support disk 150 is positioned on a mandrel 124 the function of which is identical to that of the mandrel 24 mentioned in the description of the embodiment of the invention illustrated in FIGURES 1 and 2. Fluid, uncured propellant is next introduced into the space within casing 110 above said disk to form a second solid propellant grain 118. After mandrel 124 has been removed from grains 116, 118, a perforation 120, 122 is provided in each of the grains. Thus the spaces between spacers 134, 136 form a radially extending slot in the rocket motor assembly which communicates with the perforations 120, 122 in grains 116, 118. As in the case of the first described embodiment of the invention, the spacers 134, 136 and disk 150 form this radial slot without requiring the laborious removal of a frangible mold from the solid propellant grain of a rocket motor.

Figure 5:
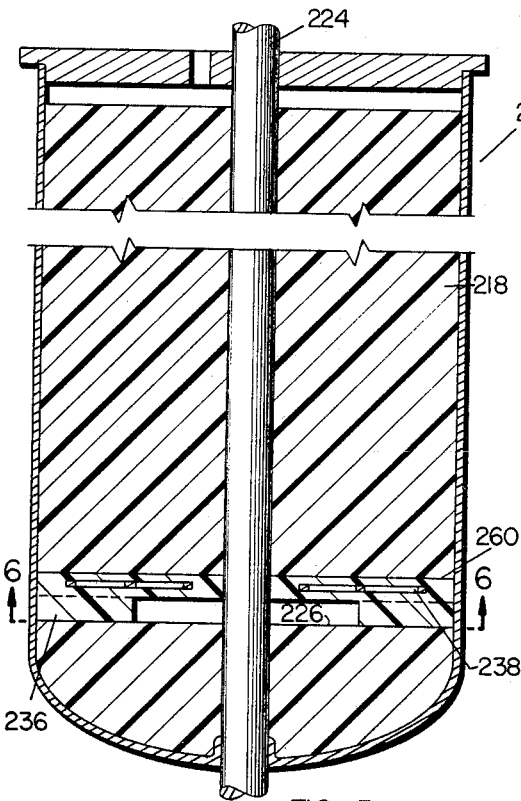
FIGURE 5 is a sectional view taken along the longitudinal axis of a third solid propellant rocket motor assembly constituting still another embodiment of the invention.
Figure 7:
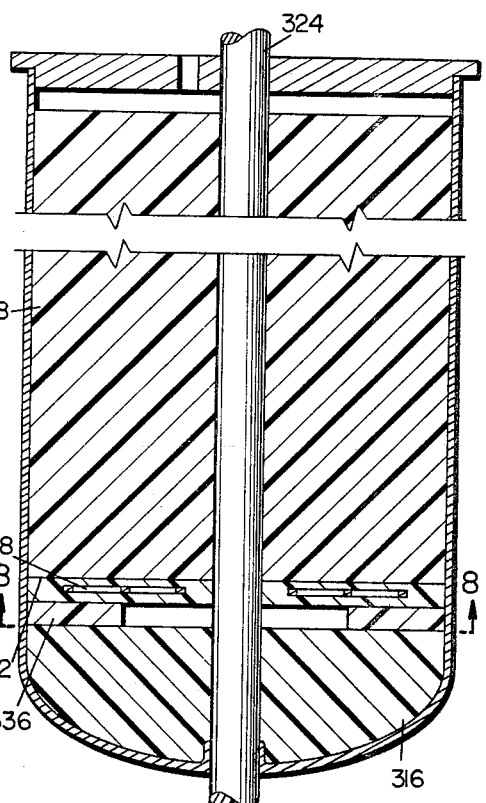
FIGURE 7 is a sectional view taken along the longitudinal axis of a fourth solid propellant rocket motor assembly constituting still another embodiment of the invention.
Figure 6:
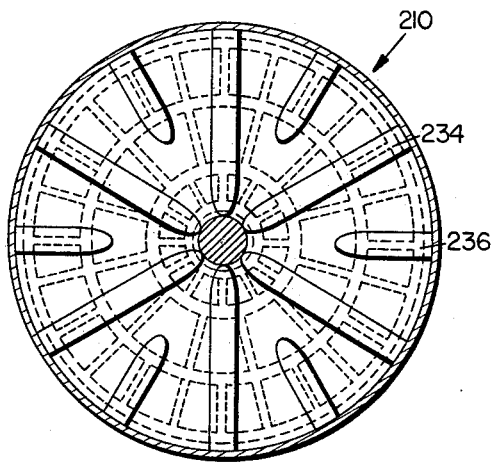
FIGURE 6 is a cross sectional view of the rocket motor assembly of FIGURE 5, taken along the plane represented by line 6—6 in the latter drawing in the indicated direction.
Figure 8:
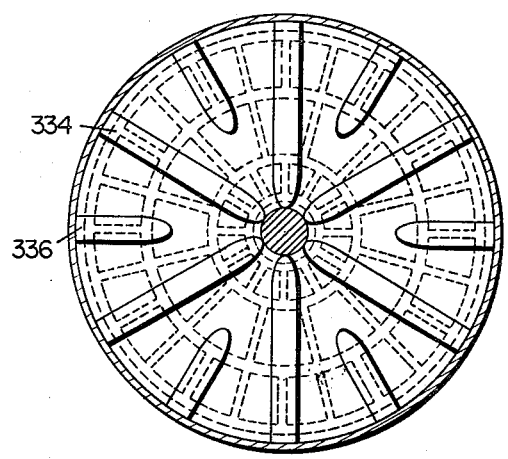
FIGURE 8 is a cross-sectional view of the rocket motor assembly of FIGURE 7, taken along the plane represented by line 8—8 in the latter drawing in the indicated direction.

Other modifications of the rocket motor assemblies illustrated in FIGURES 1 through 4 will be obvious in view of the above teachings. For example, FIGURES 5 and 6 illustrate a support disk 260 identical to support disk 32 of the embodiment illustrated in FIGURES 1 and 2, except that support disk 232 is flat whereas support disk 32 is conical. Support disk 232 is positioned between two grains 216, 218 disposed within a rocket motor casing 210, with the spacers 234, 236 formed on said support disk abutting the flat end surfaces 226 of the forward one of said grains. As illustrated in FIGURES 7 and 8, spacers 334, 336 can be separately molded of solid propellant and disposed between a flat support disk 362 and a solid propellant grain 316 located at the forward end of rocket motor casing 310. Such separately formed spacers can be bonded to either or both grain 316 and support disk 362 by a suitable adhesive. In some embodiments of the invention, there may be no need for reinforcement in the support disks thereof.

It is therefore to be understood that the scope of the invention is limited only by the terms of the appended claims.

What is claimed is:

1. In a rocket motor, the combination comprising:
   a casing;
   at least two solid propellant grains disposed in spaced, tandem relation within said casing, at least one of said grains having a perforation extending therethrough; and
   a plurality of spacers disposed between said grains and formed of solid propellant, said spacers being spaced apart circumferentially of said casing and thereof, the spaces between said spacers communicating with said perforation.

2. The combination defined in claim 1 wherein said spacers are integrally formed on one of said grains and project from an end surface thereof.

3. The combination defined in claim 1 including a support disk disposed between said spacers and one of said grains and formed of solid propellant.

4. The combination defined in claim 3 including reinforcement means embedded within said support disk.

5. The combination defined in claim 3 wherein said spacers are integrally formed on said support disk and project from one side thereof.

6. The combination defined in claim 1 including a pair of support disks disposed on opposite sides of said spacers and formed of solid propellant, said spacers being integrally formed on one of said support disks.

7. The combination defined in claim 6 including reinforcement means embedded within at least one of said support disks.

8. A method of forming a radially extending slot in a solid propellant rocket motor, comprising:
   positioning the casing of said rocket motor vertically;
   positioning a first precured centrally-apertured disk of propellant on a mandrel longitudinally disposed within said casing, said first disk being transversely positioned within said casing at the point where a radially extending slot is to be formed in the solid propellant grain of said rocket motor, the diameter of said first disk being such that its peripheral edge is adjacent the wall of said casing, said first disk having an access hole extending therethrough;
   injecting uncured propellant through said access hole in said first disk into the space within said casing below said first disk, and thereafter curing said propellant;
   positioning a second precured centrally-apertured disk of propellant on said mandrel and spacing said second disk from said first disk by means of a plurality of elongated spacers disposed therebetween, said spacers being formed of solid propellant, spaced apart circumferentially of said casing and disposed radially thereof and fixedly positioned relative to said first and second disks;
   introducing uncured propellant in the space within said casing above said second disk, and thereafter curing said propellant; and
   withdrawing said mandrel from said casing and cured propellant.

References Cited
UNITED STATES PATENTS

| | | | |
|---|---|---|---|
| 826,293 | 7/1906 | Unge | 60—250 XR |
| 2,750,887 | 6/1956 | Marcus | 60—255 XR |
| 3,088,273 | 5/1963 | Adelman et al. | 60—253 |
| 3,128,600 | 4/1964 | Oldham | 60—250 |

CARLTON R. CROYLE, Primary Examiner

U.S. Cl. X.R.

60—255; 86—1; 102—102; 264—3